May 24, 1955     B. ESTERMAN     2,708,847
TONOMETERS
Filed May 28, 1954
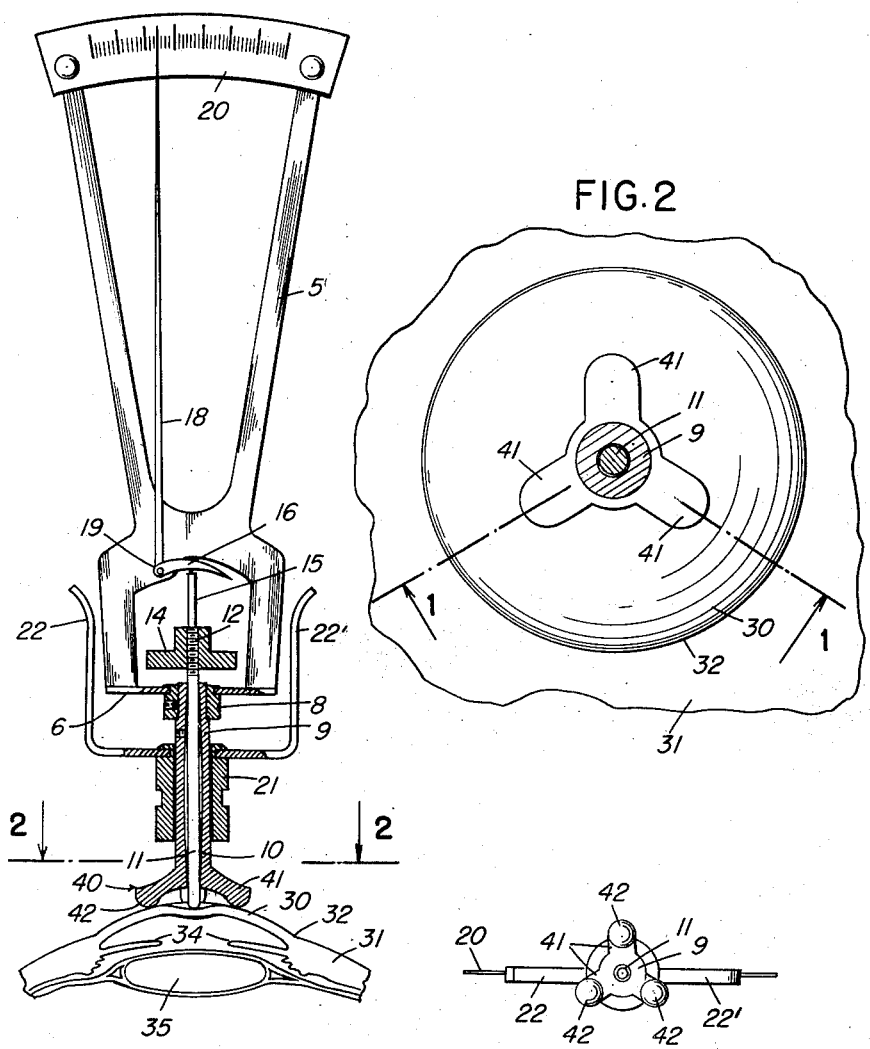
INVENTOR.
Benjamin Esterman
BY
Churchill, Rich, Weymouth & Cougel
Attorneys

United States Patent Office 2,708,847
Patented May 24, 1955

2,708,847

TONOMETERS

Benjamin Esterman, Far Rockaway, N. Y.

Application May 28, 1954, Serial No. 433,026

2 Claims. (Cl. 73—80)

This invention relates to tonometers, diagnostic instruments for measuring the pressure of fluid within the eyeball, or ocular tension.

The type of tonometer now in current use is exemplified by U. S. Patent No. 2,520,223 of August 29, 1950, and the present invention relates to improvements thereon which overcome certain shortcomings and make it easier and safer to use.

Ocular tension is measured for the detection of glaucoma, a disease characterized by increased fluid pressure in the eyeball and one of the commonest causes of blindness. If detected in its early stages, the disease can usually be arrested. Often persons with this disease are not seen by the eye specialist until too late because the tonometer as now constructed has two principal disadvantages which keep it out of the armamentarium of the general practitioner and require the experience of the specialist for its satisfactory use. The only other means for estimating ocular tension is palpation of the eyeball with the fingertips, which at best gives only a qualitative approximation, and this is usually the only means of detection the general practioner has. If he could safely and effectively use the tonometer and its use thus became more widespread, the sight of many persons might be saved by earlier diagnosis in a greater number of cases.

The two main disadvantages of the type of tonometer described in the above patent are: (1) It has a round footplate with a concave under surface which is intended to rest squarely on the cornea of the patient's eye as he lies on his back looking at a point on the ceiling directly above his face. Unless the entire footplate rests completely flush and evenly on the cornea and the instrument is held vertically by the examiner, the result will be a highly erroneous and misleading reading which is worse than useless. Only the eye specialist today has the experience and training to avoid this pitfall. (2) Unless the footplate is applied to the eye with great delicacy and precision, the edge of the instrument may scrape the surface of the eye causing painful injury to the delicate membrane and possible damage to sight.

The invention overcomes these difficulties by providing an improved form of footplate which utilizes in a particular form the principle of the tripod which assures more accurate positioning of the instrument, requires less skill, reduces the danger of injury and assures more accurate pressure indications.

The invention will best be understood from the following detailed description of the present preferred embodiment thereof taken in conjunction with the drawings, in which Fig. 1 is an elevation partly in section of a complete tonometer shown as resting on the cornea of an eye which is diagrammatically represented;

Fig. 2 is an enlarged sectional plan taken on line 2—2 of Fig. 1; and

Fig. 3 is a bottom view of the tonometer.

The general construction of a tonometer of the type illustrated in the drawings being well known and fully described in the above-mentioned patent, it will be sufficient to point out its principal parts. The instrument consists of a frame 5, having a bridge piece 6, which is attached to a collar 8. The collar is adjustably secured to the top of a cylinder 9, having a bore 10, in which a plunger 11 is slidably mounted. A portion of the plunger, which extends outwardly through the top of the cylinder, is threaded at 12 or otherwise adapted to receive a weight 14 and extends upwardly beyond the weight at 15 into engagement with a lever arm 16 connected to a pointer 18 and mounted on a pivot 19. The top of frame 5 carries a scale 20 against which the position of the pointer 18 may be read.

Surrounding the cylinder 9 is a loosely fitting sleeve 21, having a pair of handles or finger grips 22 and 22', by which the instrument may be supported and positioned by the operator. It will be understood that when placed on a cornea as shown in Fig. 1, the footplate of the instrument rests thereon and the plunger 11 is separately urged against the cornea by its own weight plus that of the weight 14, thus producing a reading on the scale 20, which is dependent on the internal fluid pressure of the eyeball.

That portion of the eyeball which is shown in Fig. 1, comprises the cornea 30, which merges with the sclera 31 along a substantially circular line 32, the iris 34 and the lens 35.

In accordance with the invention, the base portion 40 of cylinder 9 is formed with three legs 41, as best shown in Figs. 2 and 3, each leg having on its under surface a smoothy rounded protuberance 42, the surface of which is preferably spherical. For example, the under side of each leg may be a small hemisphere or smaller portion of a sphere. These three legs give the instrument a tripod support on the cornea 30, and it is readily observable by the operator when all three legs are in contact with the surface of the cornea as distinguished from the situation which exists with a solid footplate which completely obscures the area of contact. So long as the eye is directed upwardly with the line of sight on a vertical axis and all three legs are in contact with the cornea equidistant from its observable center, the tonometer is known to be correctly positioned and the reading on the scale may be assumed to be correct. No part of the base 40 which can come in contact with the surface of the eye is liable to injure it because there are no edges or corners and no part of the base other than the smoothly rounded protuberances can touch the eye.

Thus, this instrument, by reducing both the inaccuracy and the hazard of tonometry requires much less training and experience for its use and makes available to the general practitioner a device which may safely be used for the accurate detection of glaucoma in hands not as highly skilled as those of the eye specialist.

Obivous modifications of the details of construction of the illustrative embodiment may be made without departing from the spirit of the invention as defined in the claims.

What I claim is:

1. In a tonometer having a cylinder and a plunger slidably mounted therein and adapted to extend through the lower end thereof for engagement with the cornea of an eye being tested, a three-legged base on said cylinder, the legs of said base being spaced apart and having smoothly rounded protuberances adapted separately to engage the surface of the cornea surrounding the point of contact of said plunger, said protuberances being spaced equidistant from the axis of said plunger.

2. In a tonometer having a cylinder and a plunger slidably mounted therein and adapted to extend through the lower end thereof for engagement with the cornea of an eye being tested, a three-legged base on said cylinder, the legs of said base having smooth rounded protuberances adapted separately to engage the surface of the cornea surrounding the point of contact of said plunger, said protuberances being spaced equidistant from each other and from the axis of said plunger.

References Cited in the file of this patent

UNITED STATES PATENTS

| | | |
|---|---|---|
| 2,323,925 | Markwardt | July 13, 1943 |
| 2,366,645 | Ollendorff | Jan. 2, 1945 |
| 2,520,223 | Sovatkin | Aug. 29, 1950 |
| 2,544,205 | Williams | Mar. 6, 1951 |